(12) United States Patent
Sprague (10) Patent No.: US 7,954,953 B2
(45) Date of Patent: Jun. 7, 2011

(54) SCANNED BEAM OVERLAY PROJECTION

(75) Inventor: Randall B. Sprague, Hansville, WA (US)

(73) Assignee: Microvision, Inc., Redmond, WA (US)

( * ) Notice: Subject to any disclaimer, the term of this patent is extended or adjusted under 35 U.S.C. 154(b) by 373 days.

(21) Appl. No.: 12/182,264

(22) Filed: Jul. 30, 2008

(65) Prior Publication Data

US 2010/0026960 A1    Feb. 4, 2010

(51) Int. Cl.
  G03B 21/26    (2006.01)
  G02B 21/06    (2006.01)
  G01N 21/86    (2006.01)
(52) U.S. Cl. .................. 353/28; 359/385; 250/559.06
(58) Field of Classification Search .......... 353/28, 353/30, 69, 70, 97, 101; 250/216, 221, 201.2, 250/205, 208.1, 234, 548, 555, 559.3, 559.4, 250/559.06; 359/198.1, 205.1, 210.1, 212.1, 359/368, 383, 385; 358/473, 475; 356/400, 356/401
See application file for complete search history.

(56) References Cited

U.S. PATENT DOCUMENTS

| | | | | |
|---|---|---|---|---|
| 5,148,310 | A * | 9/1992 | Batchko | 359/479 |
| 6,134,002 | A * | 10/2000 | Stimson et al. | 356/326 |
| 2003/0038822 | A1 * | 2/2003 | Raskar | 345/632 |
| 2004/0080467 | A1 | 4/2004 | Chinthammit et al. | |
| 2004/0141162 | A1 * | 7/2004 | Olbrich | 353/119 |
| 2006/0170870 | A1 | 8/2006 | Kaufman et al. | |
| 2007/0176851 | A1 | 8/2007 | Willey et al. | |

FOREIGN PATENT DOCUMENTS

JP    2005070412    3/2005

OTHER PUBLICATIONS

PCT Search Report, , "PCT Search Report and Written Opinion", PCT/US2009/049544, *search report for PCT case corresponding to US case* Feb. 2, 2010.

* cited by examiner

*Primary Examiner* — Georgia Y Epps
*Assistant Examiner* — Don Williams
(74) *Attorney, Agent, or Firm* — Kevin D. Wills (57) ABSTRACT

A scanning beam overlay projection system displays an image on a projection surface by scanning a light beam in a raster pattern. Reflective spots on the projection surface reflect light back to the projection system when illuminated by the light beam. A photodetector in the projection system detects the reflected light, and timing circuits determine where in the raster pattern the reflective spots are located. The image can be scaled and warped to correlate tagged points within the image with the locations of the reflective spots on the projection surface.

7 Claims, 7 Drawing Sheets

SCANNED BEAM OVERLAY PROJECTION

FIELD

The present invention relates generally to augmented reality, and more specifically to projecting images on objects.

BACKGROUND

"Augmented reality" is an environment that includes both virtual and real-world elements. For example, a projector may display (or "overlay") an image on real-world objects. To get the projected image to correctly overlay the real-world environment, the image may be scaled and warped to match the real-world objects or surfaces upon which it is projected. This scaling and warping compensates for the projector's projection angle, distance to the real-world objects, and three-dimensional curves on the projection surface in the real-world.

Scaling and warping algorithms are known. If one can correlate a sufficient number of points in the underlying image to be projected with locations on the projection surface, the underlying image can be scaled and warped to match the projection surface using known methods. Correlating points within the underlying image with locations on the projection surface can be a hard problem, especially if the projector is in motion.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
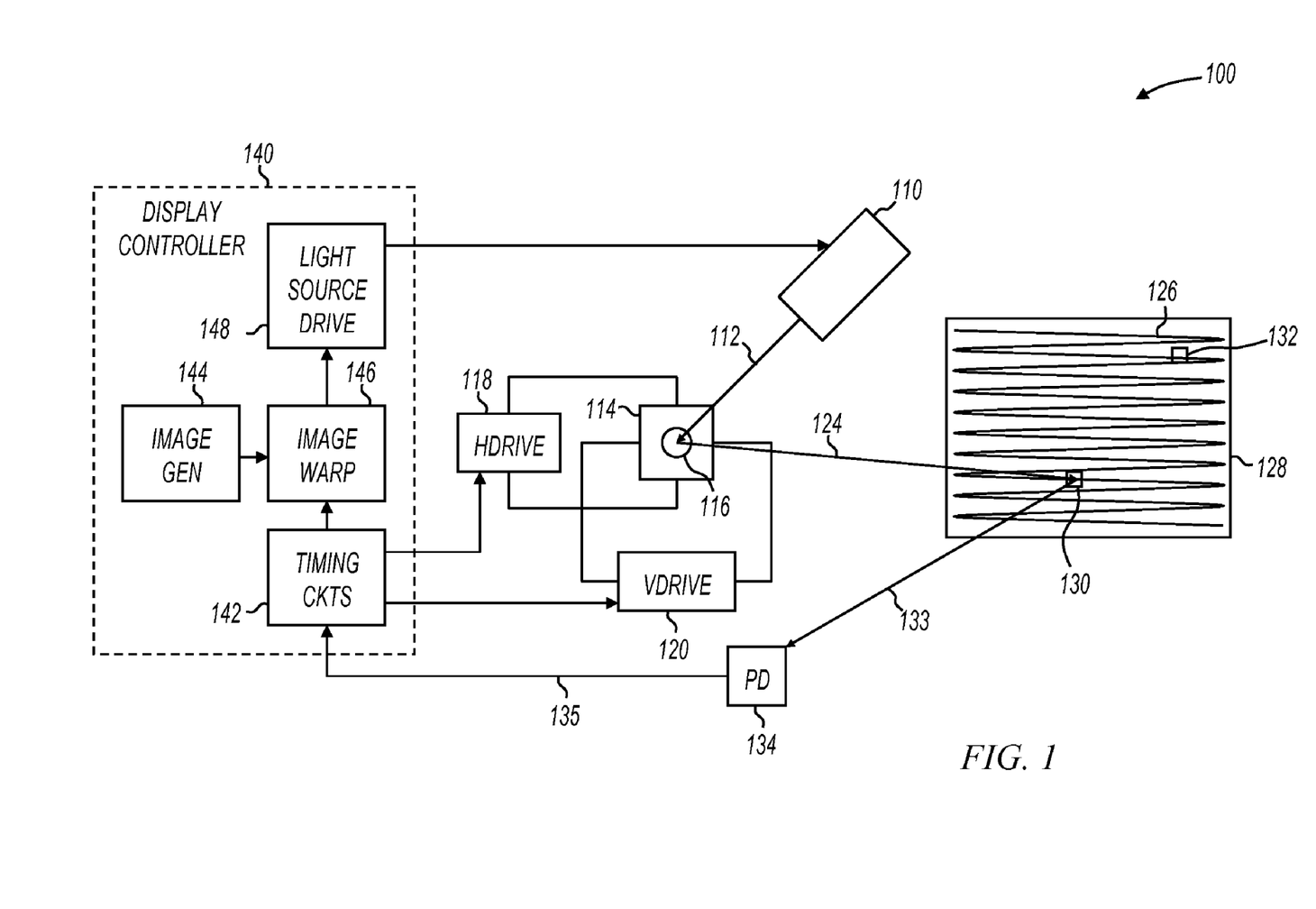
FIG. 1 shows a scanned beam overlay projection system in accordance with various embodiments of the present invention.

FIG. 1 shows a scanned beam overlay projection system in accordance with various embodiments of the present invention. As shown in FIG. 1, scanned beam overlay projection system 100 includes a light source 110, which may be a laser light source such as a laser diode or the like, capable of emitting a beam 112 which may be a laser beam. The beam 112 impinges on a scanning platform 114 which may include a microelectromechanical system (MEMS) based scanner or the like, and reflects off of scanning mirror 116 to generate a controlled output beam 124. A horizontal drive circuit 118 and a vertical drive circuit 120 modulate the direction in which scanning mirror 116 is deflected to cause output beam 124 to generate a raster scan 126, thereby creating a displayed image on a projection surface 128.

Projection surface 128 has reflective spots 130 and 132. Reflective spots 130 and 132 may be integrated into the projection surface or may be applied with glue, tape, or any other means. Reflective spots 130 and 132 may incorporate any type of reflective device or material that can reflect all or a portion of output beam 124. For example, in some embodiments, reflective spots 130 and 132 may be corner reflectors or retroreflectors. Also for example, in other embodiments, reflective spots 130 and 132 may include reflective tape with diffusive qualities.

When controlled output beam 124 passes one of reflective spots 130 or 132, light is reflected as shown at 133. The reflected light is sensed by a photodetector (PD) 134. As described more fully below, the timing of the reflected light can be compared to the timing of the raster scan 126 to determine the location of the reflective spots relative to the image painted by raster scan 126. For example, when a particular pixel is reflected by a reflective spot, determining the location of that pixel within the raster scan 126 also determines the location of the reflective spot within the raster scan 126.

A display controller 140 includes timing circuits 142, image generation component 144, image warping engine 146, and light source drive circuits 148. Timing circuits 142 provide drive signals to horizontal drive circuit 118 and vertical drive circuit 120 to control the timing of the raster scan operation of scanning mirror 116. In some embodiments, timing circuits 142 produce vertical and horizontal sync signals, and the signals used to drive circuits 118 and 120 are derived therefrom. In some embodiments, the horizontal drive circuit 118 and the vertical drive circuit 120 are combined, and timing circuits 142 produces one composite signal to effect the raster scanning operation of mirror 116.

Timing circuits 142 also receive one or more signals from PD 134. These signals provide timing information regarding when light is reflected off the projection surface. For example, when controlled output beam 124 scans past reflective spot 132, PD 134 will provide a signal on node 135 to timing circuits 142. Also for example, when controlled output beam 124 scans past reflective spot 130 (as shown in FIG. 1), PD 134 will provide a signal on node 135 to timing circuits 142. Timing circuits 142 correlates the timing of signals received from PD 134 with its own internal timing signals to determine where in the raster scan the reflective spots are located. Example timing is described below with reference to FIG. 2.

Image generation component 144 generates an image to be projected. In some embodiments, image generation component 144 is a data store that includes a static representation of an image. For example, image generation component 144 may be a memory device such as a random access memory or a hard disk drive. In other embodiments, image generation component 144 may be an input device that receives image data from outside display controller 140. The ultimate source of image data is not a limitation of the present invention.

Image warping engine 146 receives image data from image generation component 144. The image data received corresponds to an image that is to be overlayed on projection surface 128. Image warping engine 146 also receives information from timing circuits 142. The information received from timing circuits 142 allows image warping engine 146 to correlate locations on the projection surface with points in the image data. In response, image warping engine 146 scales and warps the image to be projected. For example, timing circuits 142 may provide (x,y) coordinates to image warping engine 146, where the (x,y) coordinates represent locations within the raster scan of locations on the projection surface. The image data may include tags that allow specific points within the image to be correlated with the (x,y) coordinates that represent locations on the projection surface. Image warping engine 146 can then warp and scale the image such that the tagged points in the image overlay the locations on the projection surface.

The various functional blocks shown within display controller 140 may be implemented in hardware, software, or any combination. For example, image warping engine 146 may be implemented as a software module that runs on a processor (not shown). Also for example, image warping engine 146 may be implemented in dedicated hardware such as an application specific integrated circuit (ASIC).

Light source drive circuits 148 convert pixel information of the scaled and warped image into modulation signal(s) suitable to drive light source 110. In some embodiments, light source 110 includes one or more laser diodes, and light source drive circuits 140 produce currents to drive the laser diodes. The modulation signals are synchronized to the operation of scanning platform 114 such that each pixel is displayed in its correct location relative to raster scan 126. Display controller 140 may also control other various functions of scanned beam overlay projection system 100.

Figure 2:
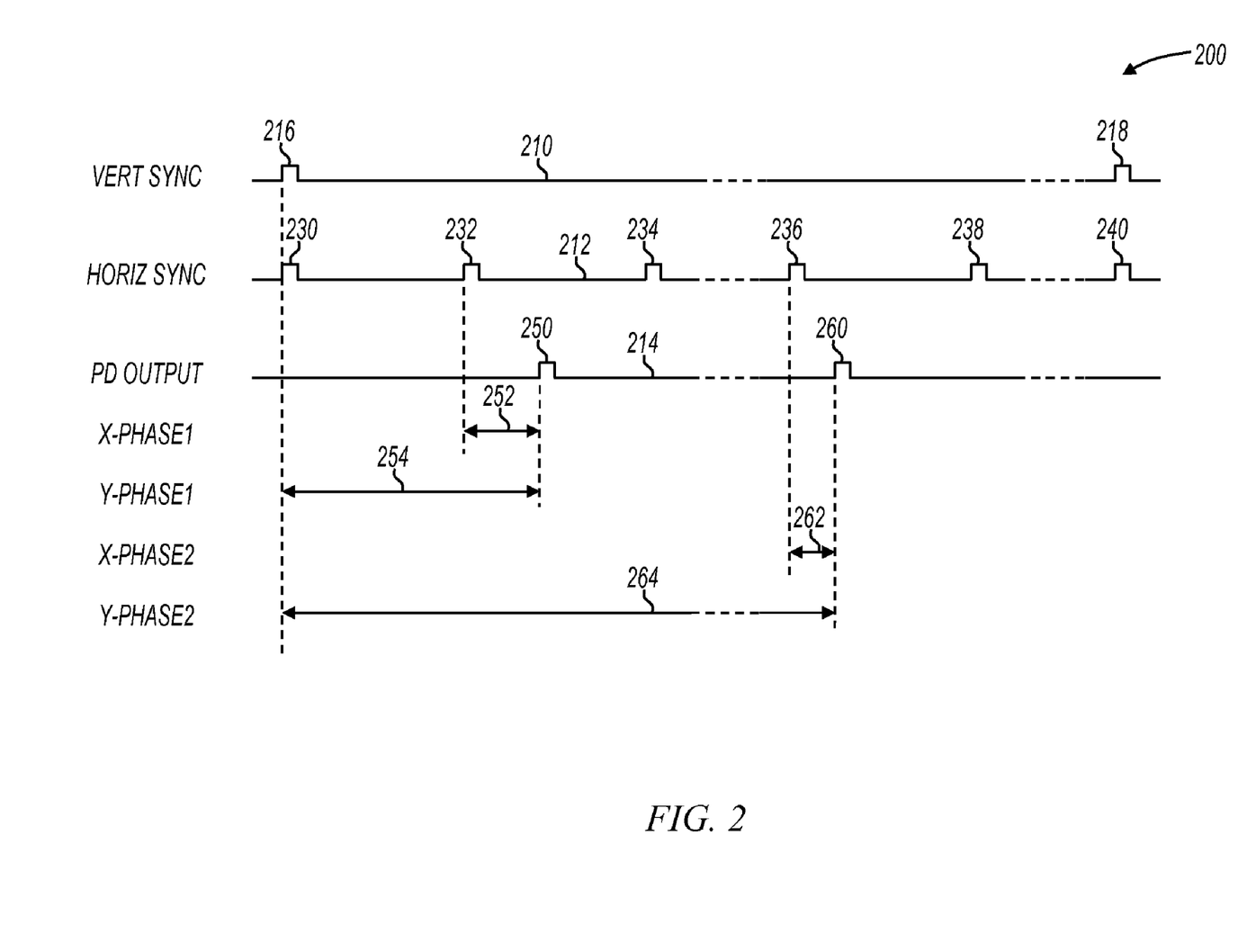
FIG. 2 shows a timing diagram of sync signals for a scanned beam overlay projection system from which locations of points on a projection surface may be determined in accordance with various embodiments of the present invention.

FIG. 2 shows a timing diagram of sync signals for a scanned beam overlay projection system from which locations of points on a projection surface may be determined in accordance with various embodiments of the present invention. As shown in timing diagram 200 of FIG. 2, the VERT SYNC signal 210 and the HORIZ SYNC signal 212 for raster scan 126 (FIG. 1) may be utilized to compute the X-Y position within the raster scan of reflected pixels, and therefore specific locations on the projection surface.

The VERT SYNC signal 210 is asserted once for each vertical scan of raster scan 126, and the HORIZ SYNC signal 212 is asserted once for each horizontal scan of raster scan 126. The VERT SYNC signal is typically asserted at the beginning of a vertical scan, although this is not a limitation of the present invention. For example, if the vertical scan starts at the top and proceeds down, then the VERT SYNC signal 210 may be asserted when the output beam is at the top. This is illustrated in FIG. 2 by vertical sync pulses 216 and 218. Likewise, the HORIZ SYNC signal 212 is typically asserted at the beginning of a horizontal scan, although this is not a limitation of the present invention. For example, if the horizontal scan starts at the left and proceeds to the right, then the HORIZ SYNC signal 212 may be asserted when the output beam is at the left. This is illustrated in FIG. 2 by horizontal sync pulses 230, 232, 234, 236, 238, and 240.

The photodetector (PD 134, FIG. 1) produces pulses when light is received. In FIG. 2, the photodetector output (PD OUTPUT) signal 214 is shown having two pulses 250 and 260. Pulses 250 and 260 are referred to herein as "reflection pulses". Reflection pulse 250 corresponds to light reflected from reflective spot 132 (FIG. 1), and reflection pulse 260 corresponds to light reflected from reflective spot 130.

The X position of a reflected pixel may be computed from the corresponding reflection pulse within PD OUTPUT signal 214 by determining the phase of the reflection pulse relative to a horizontal sync pulse. For example, the X position of the reflected pixel corresponding to reflection pulse 250 may be computed by determining the time difference (corresponding to phase delay) 252 between reflection pulse 250 and the horizontal sync pulse 232. This time difference is representative of the timing of the reflected pixel with respect to the horizontal sweep of output beam 124 in raster scan 126, and thereby corresponds to the X position of the reflected pixel. Since the sweep of output beam 124 in raster scan 126 may not have a uniform velocity over all of X, an adjustment may be made to map the time difference 252 to the proper X position. This mapping can be made since each pixel along the horizontal scan trajectory of output beam 124 corresponds to a particular and repeatable timing phase delay (e.g., 252) from a horizontal sync pulse.

Similarly, the Y position of a reflected pixel may be computed from the corresponding reflection pulse within PD OUTPUT signal 214 by determining the phase of the reflection pulse relative to a vertical sync pulse. For example, the Y position of the reflected pixel corresponding to reflection pulse 250 may be computed by determining the time difference (corresponding to phase delay) 254 between reflection pulse 250 and the vertical sync pulse 216. This time difference is representative of the timing of the reflected pixel with respect to the vertical sweep of output beam 124 in raster scan 126 and thereby corresponds to the Y position of the reflected pixel. Again, adjustments in the mapping between timing of the reflection pulse and the corresponding Y position may be made to account for scanning artifacts such as varying scan speeds and vertical overscan (where the beam scans past the viewing area and is blanked).

FIG. 2 demonstrates the time measurements of two reflected pixels. A pixel reflected by reflective spot 132 results in reflection pulse 250. The horizontal time difference is measured at 252 and the vertical time difference is measured at 254. Likewise, a pixel reflected by reflective spot 130 results in reflection pulse 260. The horizontal time difference is measured at 262, and the vertical time difference is measured at 264. Although time differences are measured for two pixels in FIG. 2 are shown in FIG. 2, this is not a limitation of the present invention. Any number of reflective spots may be utilized, resulting in any number of reflection pulses. Measurements can be made for each of these reflection pulses.

In one or more embodiments, computation of the X and Y positions may be made via a look up table that uses the measured time differences as the address into the look up table. Alternatively, the X-Y positions may be computed algebraically using the measured time differences and known phase offsets of the video output to the VERT SYNC pulses and HORIZ SYNC pulses. In some embodiments, the photodetector is likely to capture reflections from more than one pixel from a single reflective spot on the projection surface 128. In the horizontal direction this may result in a longer reflection pulse width. This may be accounted for by determining the X position as the center or alternatively the leading edge of the longer reflection pulse. However, in the vertical direction it is likely that multiple reflection pulses will be generated from adjacent rows of scanning. A position determining decode algorithm can either compute the Y position based on the first of such reflection pulses, or based on an average vertical position of all reflection pulses.

The output beam may scan in one direction and then retrace, or the output beam may be scan in both directions. For example, in some embodiments, the output beam may paint pixels while scanning from left to right, and then blank while retracing from right to left. In other embodiments, the output beam may continuously paint pixels while scanning left to right and right to left. The same is true of the vertical scan. The techniques described with reference to FIG. 2 are applicable for each of these embodiments. In addition, the techniques illustrated in FIG. 2 are applicable regardless where in the raster scan the SYNC signals appear. If the locations within the raster scan of the SYNC signals are known, offsets can be applied to compensate for their position within the raster scan.

Figure 3:
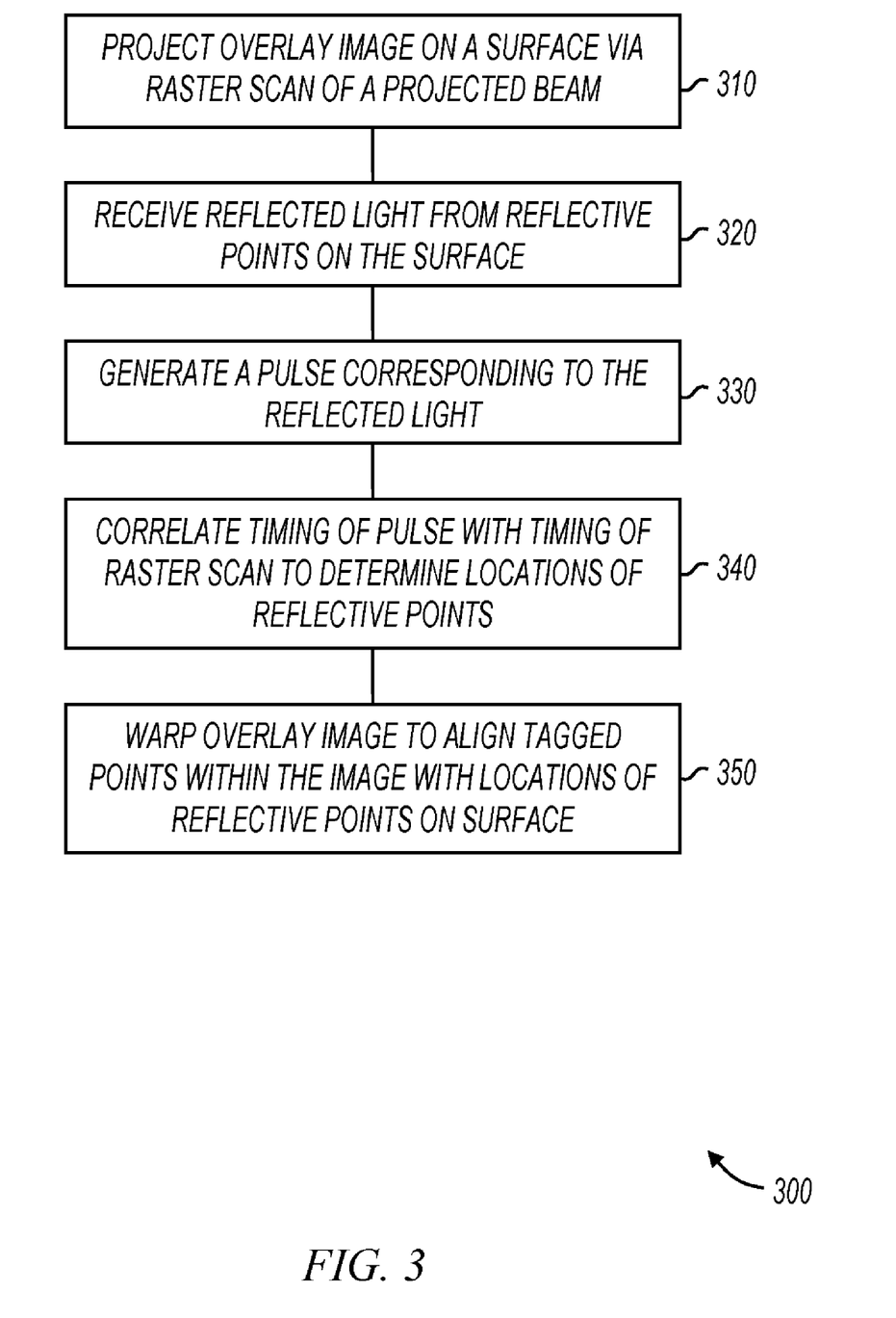
FIG. 3 shows a flowchart of a method in accordance with various embodiments of the present invention.

FIG. 3 shows a flowchart of a method in accordance with various embodiments of the present invention. Method 300 shows actions that can be used to overlay an image on a projection surface such that points in the overlayed image are correctly aligned with certain locations on the projection surface. At 310, an overlay image is projected onto a surface via a raster scan of a projected beam. This is shown in FIG. 1 where beam 124 is swept back and forth and up and down in raster scan 126 to project an image on surface 128.

At 320, reflected light is received from reflective points on the surface. The actions of 320 correspond to PD 134 receiving light reflected from reflective spots 130 and 132. At 330, pulse(s) are generated corresponding to the reflected light. The pulses are generated on signal line 135 by PD 134. Example reflection pulses are shown in FIG. 2 at 250 and 260. At 340, the timing of the reflection pulses are correlated with timing of the raster scan to determine locations of the reflective points. As shown in FIG. 2, the correlation may be accomplished by comparing the timing of the reflection pulses to the timing of vertical and horizontal sync pulses.

At 350, the overlay image may be warped to align tagged points within the image with locations of reflective points on the surface. For example, if the projector has been moved closer to the projection surface, the overlay image may have grown smaller, and the overlay image may be stretched to realign the image with the projection surface. Similarly, if projector has moved left or right, the reflective points on the surface may no longer align with the tagged points within the image. The actions of 350 will cause the overlayed image to once again correctly align with the projection surface.

Figure 4:
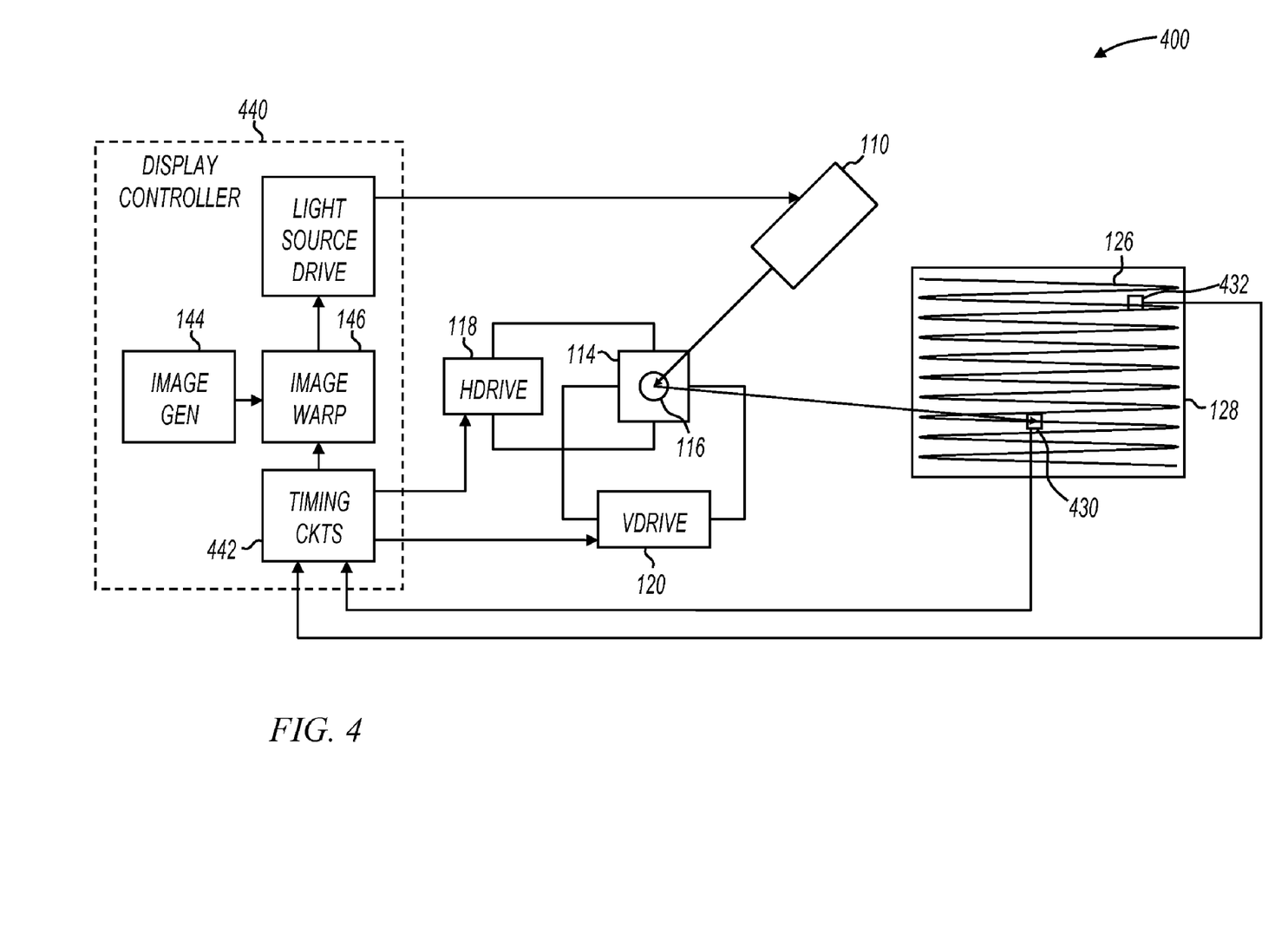
FIG. 4 shows a scanned beam overlay projection system in accordance with various embodiments of the present invention.

FIG. 4 shows a scanned beam overlay projection system in accordance with various embodiments of the present invention. Scanned beam overlay projection system 400 includes light source 110, scanning platform 114, horizontal drive circuit 118, and vertical drive circuit 120, all of which are described above with reference to FIG. 1. Scanned beam overlay projector 400 scans an output beam 124 to generate a raster scan 126, thereby creating a displayed image on a projection surface 128.

Projection surface 128 has photodetectors 430 and 432. Photodetectors 430 and 432 may be integrated into the projection surface or may be applied with glue, tape, or any other means. Photodetectors 430 and 432 are coupled to timing circuits 442 by links 431 and 433. Photodetectors 430 and 432 detect light and generate reflection pulses on links 431 and 433 when output beam 124 scans past. For example, when output beam 124 scans past photodetector 430, a reflection pulse is generated on link 431. Similarly, when output beam 124 scans past photodetector 432, a reflection pulse is generated on link 433.

In one or more embodiments, links 131 and 133 may include wired links having cables connected between photodetectors 430 and 432 and timing circuits 442. Alternatively, links 131 and 133 may include wireless links such as radiofrequency (RF) links. In one particular embodiment, links 131 and 133 include BLUETOOTH links as specified by the BLUETOOTH Special Interest Group (SIG), although the scope of the claimed subject matter is not limited in this respect.

Display controller 440 includes timing circuits 442, image generation component 144, image warping engine 146, and light source drive circuits 148. Image generation component 144, image warping engine 146, and light source drive circuits 148 are described above with reference to FIG. 1. Timing circuits 442 are similar to timing circuits 142, with the exception that reflection pulses are received from photodetectors co-located with the projection surface rather than from a photodetector co-located with the projector.

In some embodiments, timing circuits 442 receive reflection pulses over multiple links as shown in FIG. 4. In other embodiments, timing circuits 442 receive reflection pulses over a single multiplexed link. As described above, the link(s) may be wired, wireless, or any combination.

Timing circuits 442 correlate the received reflection pulses with the raster scan to determine the location of the photodetectors within the raster scan as described above with reference to FIGS. 1-3.

FIG. 4 shows photodetectors co-located with the projection surface, and FIG. 1 shows a photodetector co-located with the projector. In some embodiments, photodetectors are co-located at both the projection surface and the projector.

Figure 5:
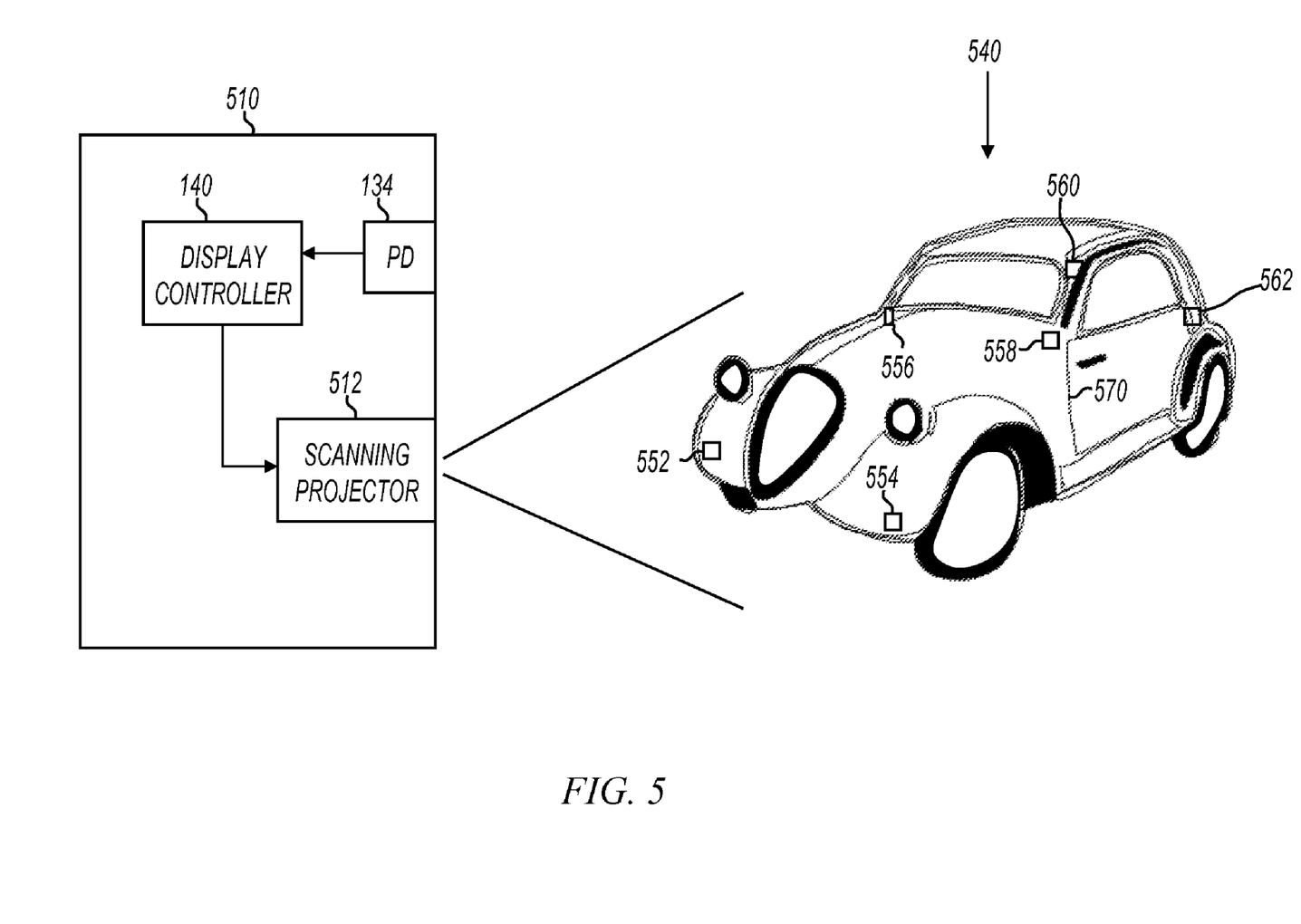
FIG. 5 shows a scanned beam overlay projection system to project an overlay image on a three dimensional surface in accordance with various embodiments of the present invention.

FIG. 5 shows a scanned beam overlay projection system to project an overlay image on a three dimensional surface in accordance with various embodiments of the present invention. Scanned beam overlay projection system 510 includes scanning projector 512, display controller 140, and photodetector (PD) 134. PD 134 and display controller 140 are described above with reference to previous figures. Scanning projector 512 may include a MEMS based laser scanning projector such as those described with reference to FIGS. 1-4 above.

In operation, scanning projector 512 displays an overlay image 570 upon a three-dimensional (3D) surface 540. The 3D surface 540 includes reflective spots 552, 554, 556, 558, 560, and 562 that correlate with tagged points within the overlayed image 570. PD 134 detects light reflected from the reflective spots on the 3D surface, and the locations of the spots within the raster scan can be determined as described above. The overlayed image 570 can then be stretched and warped such that the overlayed image 570 correctly aligns with the contours of the 3D projection surface.

The 3D surface 540 is shown in FIG. 5 as a model of an automobile. The reflective spots are placed at strategic locations on the surface, such as corners of moldings and bumpers. The overlayed image may include proposed styling features, such as window shapes, wheel well designs, etc. Different overlayed images can be viewed, allowing for rapid visual prototyping. As the perspective of the projector is changed (e.g., projector is moved about), the overlayed image retains the correct registration with the projection surface, and a designer can quickly review different designs from different perspectives. This automotive prototyping application illustrates but one possible use for scanned beam overlay projection. For example, any augmented reality application may benefit from the overlayed image alignment capabilities described herein.

Three dimensional surface 540 is shown with reflective spots, and scanned beam overlay projection system 510 is shown with a photodetector. In some embodiments, 3D surface 540 has photodetectors attached or embedded as described above with reference to FIG. 3. Scanned beam overlay projector 510 may take any form. For example, in some embodiments, projector 510 may be a handheld device, a tabletop device, or a fixed device. Also for example, in some embodiments, projector 510 may be part of a device that is worn by a user, such as eyeglasses.

Figure 6:
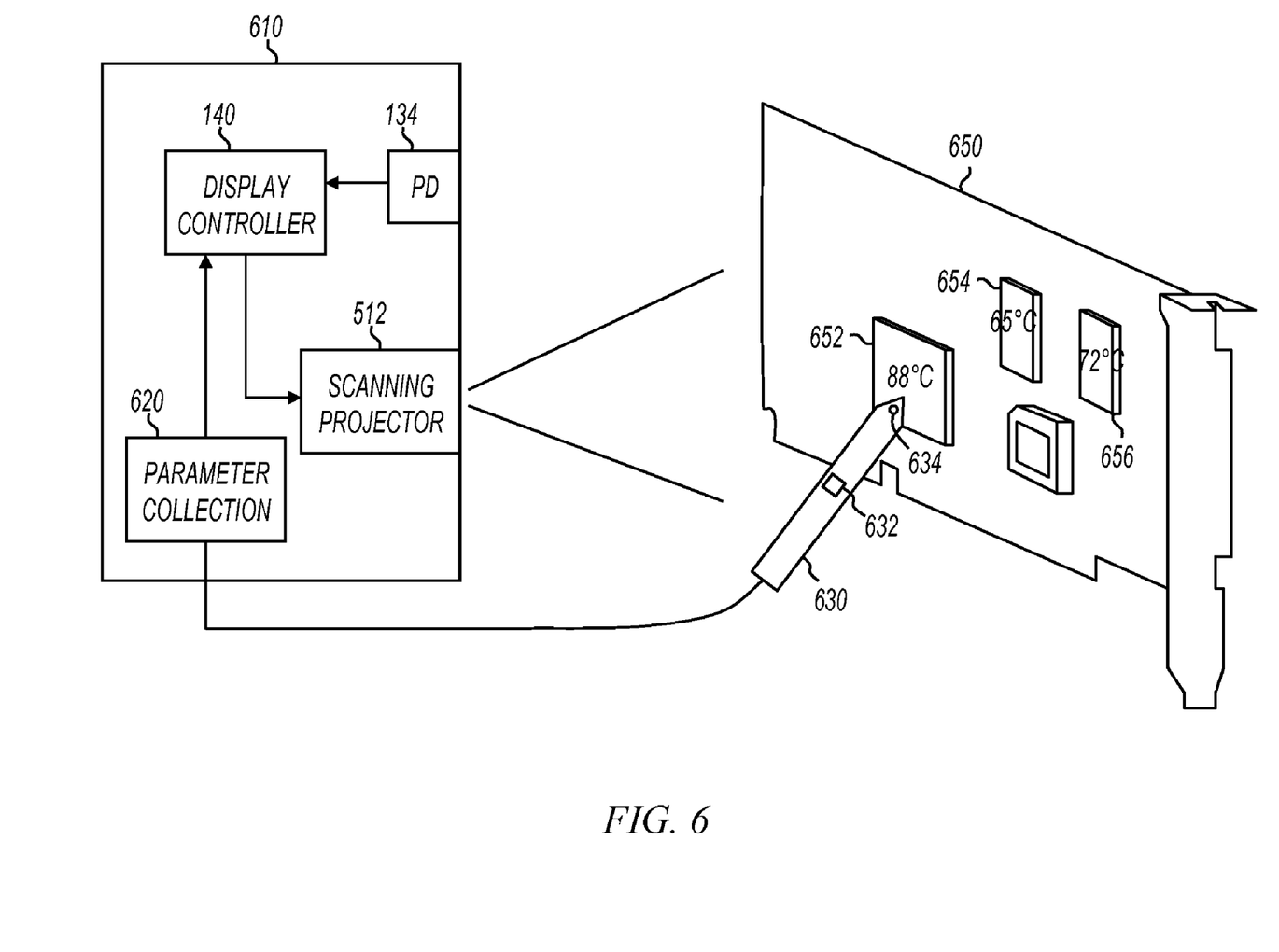
FIG. 6 shows a scanned beam overlay projection system having parameter collection and display capabilities in accordance with various embodiments of the present invention.

FIG. 6 shows a scanned beam overlay projection system having parameter collection and display capabilities in accordance with various embodiments of the present invention. Scanned beam overlay projection system 610 includes display controller 140, PD 134, scanning projector 512, and parameter collection component 620. Also shown in FIG. 6 are probe 630 and circuit board 650.

Scanning projector 512 projects an image onto a display surface, shown as circuit board 650 in FIG. 6. Circuit board 650 includes a number of components, exemplified by integrated circuits 652, 654, and 656. Circuit board 650 may include reflective spots as described above in order to align the overlayed image with the projection surface, although this is not a limitation of the present invention.

Probe 630 provides parameter measurement capabilities. In the example of FIG. 6, the parameter is temperature. Probe 630 provides the measured parametric information (temperature) and provides it to parameter collection component 620. Parameter collection component 620 provides the parametric information to display controller 140, which can then incorporate the parametric information in the displayed image.

Probe 630 includes reflective spot 634. Scanning overlay projection system 610 is able to determine the location of reflective spot 634 within the raster scan used to display the image using the techniques described herein. Probe 630 also includes button 632 to allow a user to command the probe to measure the temperature.

In operation, a user (or automated system) places probe 630 to measure temperature at a location of interest (e.g., on an integrated circuit). Button 632 is pressed, and probe 630 measures the temperature, and sends the temperature value to parameter collection component 620. Simultaneous with the button press, scanned beam overlay projection system 610 also determines the location of the tip of probe 630 by detecting light reflected from reflective spot 634. Scanning overlay projection system 610 can then correlate locations within the raster scan with parameter values.

In some embodiments, the collected parameter values are incorporated in the displayed image. For example, as shown in FIG. 6, three temperature measurements have been taken, and the temperature values have been incorporated in the displayed image. Integrated circuit 652 has been measured at 88° C., integrated circuit 654 has been measured at 65° C., and integrated circuit 656 has been measured at 72° C. More temperature values can be displayed by moving probe 630 around and pressing button 632. The measured temperature values will then appear overlayed on the projection surface.

In some embodiments, the overlayed image includes information other than the direct parameter measurement. For example, scanned beam overlay projection system 610 may use the measured parameter information to look up data to be displayed. The displayed data may include pass/fail information (for testing feedback), shading, colors, or the like. The image may be modified responsive to parametric information in any manner without departing from the scope of the present invention.

Figure 7:
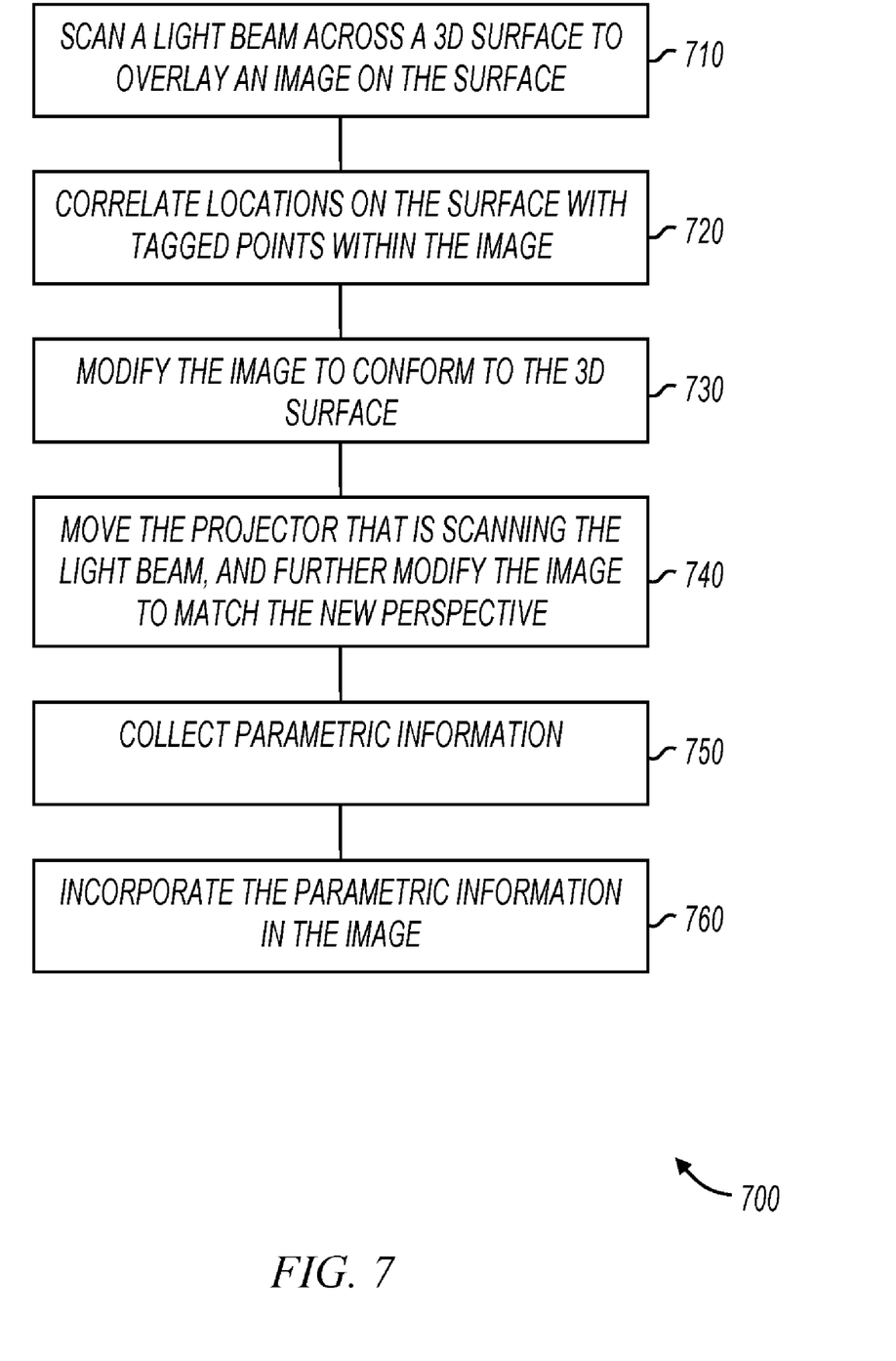
FIG. 7 shows a flowchart of a method in accordance with various embodiments of the present invention.

FIG. 7 shows a flowchart in accordance with various embodiments of the present invention. In some embodiments, method 700, or portions thereof, is performed by a scanned beam overlay projection system, embodiments of which are shown in previous figures. In other embodiments, all or portions of method 700 are performed by a hardware/software combination in an electronic system. Method 700 is not limited by the particular type of apparatus performing the method. The various actions in method 700 may be performed in the order presented, or may be performed in a different order. Further, in some embodiments, some actions listed in FIG. 7 are omitted from method 700.

Method 700 is shown beginning with block 710 in which a light beam is scanned across a three dimensional surface to overlay an image on the surface. This corresponds to any of the disclosed scanned beam overlay projection systems projecting an overlay image. At 720, locations on the 3D surface are correlated with tagged points within the image. This can be accomplished using any of the disclosed techniques or their equivalents. For example, retroreflectors can be placed at locations on the 3D surface, and the timing of reflections can be compared to pixel timing in the raster scan as shown in FIG. 2.

At 730, the image is modified to conform to the 3D surface. This includes stretching and warping the image so that the tagged points in the image align with the locations on the 3D surface. The various embodiments of the present invention are not limited by the algorithm used to modify the image.

At 740, the projector is moved, and the image is further modified to match the new perspective. As an example, scanned beam overlay projection system 510 (FIG. 5) may be moved to illuminate the automobile-shaped surface from a different angle. This will change the location of the reflective spots with respect to the image. The locations of the reflective spots can be re-determined, and the image can then be further stretched and warped to match the surface. The actions of 740 allow an overlayed image to maintain proper alignment with the projection surface even as the projector is moved about.

At 750, parametric information is collected. For example, in some embodiments, temperature data may be collected as shown in FIG. 6. In other embodiments, other parametric information may be collected. At 760, the parametric information is incorporated in the image.

In some embodiments, the actions of 750 and 760 may be omitted. For example, a 3D projection surface may be illuminated with an overlayed image without collection parametric information. In other embodiments, the actions of 740 may be omitted. For example, parametric information may be collected and displayed without moving the projector. No combination of actions shown in method 700 are considered essential.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:
1. An apparatus comprising:
   a scanning light beam projector to display an image by scanning a light beam in two dimensions on a display surface;

at least one photodetector to detect light from the light beam reflected from a plurality of reflective points on the display surface;

a timing circuit responsive to the photodetector to determine times at which the light beam passes the plurality of reflective points on the display surface; and an image warping engine to warp the image based on locations of the reflective points within the image.

2. The apparatus of claim 1 wherein the scanning light beam projector comprises a micro-electro-mechanical systems (MEMS) scanning mirror.

3. The apparatus of claim 1 further comprising a parametric input interface to receive parametric data correlated with specific points within the image.

4. The apparatus of claim 1 wherein the image warping engine comprises a software module.

5. An apparatus comprising:

a scanning projector to scan a beam of light in a vertical direction and a horizontal direction across a display surface, the scanning projector sourcing a vertical sync signal and a horizontal sync signal;

a detector component to detect when the beam of light passes a specific point on the display surface;

a timing circuit responsive to the detector component, the vertical sync signal, and the horizontal sync signal to determine times at which the beam of light passes the specific point on the display surface; and an image warping engine to warp an image displayed by the scanning projector in response to the timing circuit.

6. The apparatus of claim 5 wherein the detector component comprises a photodiode co-located with the scanning projector.

7. The apparatus of claim 6 wherein the detector comprises at least one photodiode co-located with the display surface.

* * * * *